Patented June 29, 1954

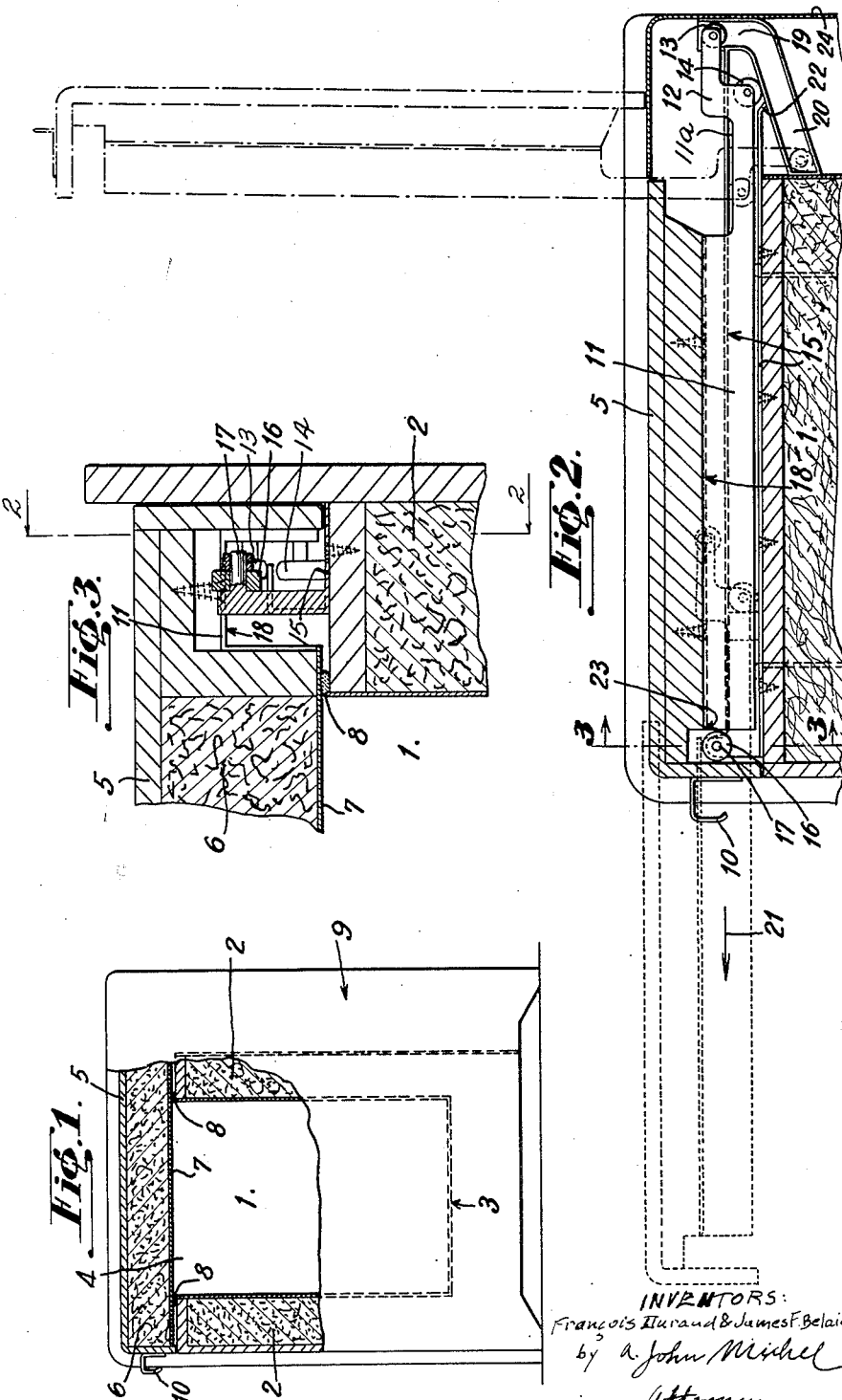

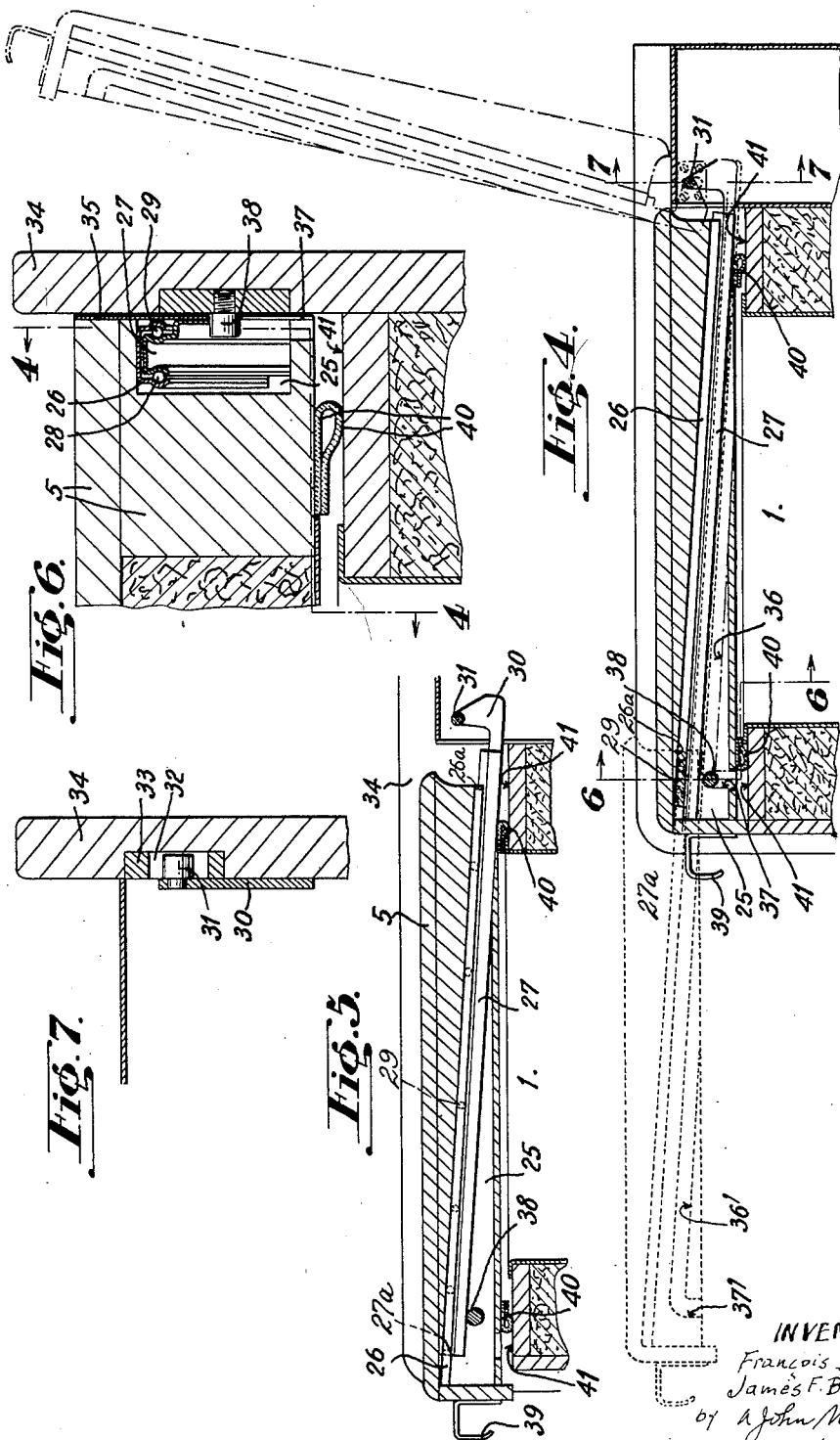

2,682,351

UNITED STATES PATENT OFFICE 2,682,351

ICE-CHEST

Francois Durand, Zurich, and James Frank Belaieff, Cologny, near Geneva, Switzerland, assignors to Intertherm A. G. Fabrik für Elektrische Apparate (Intertherm S. A. Fabrique d'Appareils Électriques), Zurich, Switzerland, a corporation of Switzerland Application November 25, 1949, Serial No. 129,491

Claims priority, application Switzerland November 30, 1948

5 Claims. (Cl. 220—38)

1

The object of the present invention is an icechest, of the type comprising a refrigerating chamber open at its upper end, and a lid adapted to rest on the said end in order to close the chamber.

The chest according to the invention is characterized in that it comprises guiding means for the lid, ensuring a translation movement of the latter, almost horizontal during at least the greater part of its run, between its open and closed positions.

The accompanying drawing shows diagrammatically and by way of example two embodiments of the chest cover according to the invention.

Fig. 1 is a side view, partly broken away.

Fig. 2 is a vertical sectional view on a larger scale.

Fig. 3 is a cross-sectional detail view along the line 3—3 of Fig. 2.

Fig. 4 is a vertical sectional view along the line 4—4 of Fig. 6.

Fig. 5 is a view similar to Fig. 4, but showing the members in another position.

Fig. 6 is a partial longitudinal section along the line 6—6 of Fig. 4.

Fig. 7 is a partial view along the line 7—7 of Fig. 4 showing a detail.

The freezer shown includes a refrigerating chamber 1, surrounded by heat-insulating material 2, on its sides and under its base 3. This chamber is open at its top 4, and a lid 5, provided on the inside with a layer of heat-insulating material 6, effects the closing of the same.

In the closed position, the inner face 7 of the lid 5 rests on a sealing joint 8 surrounding the opening of the chamber 1. The weight of the lid rests on this joint.

In the rear part 9 of the chest is arranged the refrigerating apparatus. An operating handle 10 is provided at the forward end of the lid 5 in order to actuate the latter.

On each of its sides, the lid 5 is provided with guiding means about to be described.

Fig. 3 shows one of the sides of the lid.

The said guiding means comprise a channeliron member 11, integral with the lid. Member 11 has a rear cut-out portion 11a and terminates with an arm 12 carrying two rollers 13 and 14. The guiding means moreover comprise a fixed runway 15, integral with the body of the chest and on which the roller 14 is made to roll, as will be seen hereafter. A third roller 16, turning about an axis 17, stationary with respect to the body of the chest, is adapted to co-operate with

2 the inner surface 18 of the middle limb of the channel-iron 11. This surface 18 constitutes a runway for the roller 16.

In the closed position of the lid (position shown in full lines in Fig. 2), the roller 13 is at a higher level than the roller 14 and more to the rear than the latter. It is also situated above the upper end of a guiding member 19, elbow-shaped and having an oblique lower part 20.

The operation of the lid 5 is as follows:

When the handle 10 is pulled horizontally in the direction of the arrow 21, the roller 14 at once encounters a short inclined plane 22, before reaching the runway 15. At the same moment, the roller 16 encounters the forward end 23 of the runway 18 and causes a raising of the latter, of equal amount as the distance raised by the roller 14 before it moves along the runway 15. Thus, at the beginning of the opening movement of the lid, the same is slightly raised, thus breaking the contact between the part 7 of the lid and the sealing joint 8. The weight of the lid thus ceases to act on the joint and the lid may move horizontally up to the position shown in dotted lines in Fig. 2, that is to say to the open position in which the access to the refrigerating chamber is entirely clear.

For the closing movement, the operations take place in the opposite direction, that is to say that the lid moves horizontally until the rollers 14 and 16 reach the end of their respective inclined planes, after which, at the end of the closing run, a slight dropping movement of the lid takes place, allowing it to rest on the sealing joint 8.

The lid may also be brought to the position shown in dot-and-dash lines, by a pivoting movement of the lid, due to a raising of its front edge and of the handle 10 with which it is provided. During its pivoting movement, the roller 13 engages the guiding member 19 to occupy finally the position shown in dot-and-dash lines, at the lower left-hand end of the oblique guide 20. Simultaneously, the roller 14 moves to a certain extent along the runway 15. Thus, the lid is forced, during its pivoting opening movement, to move to a small extent horizontally, thus withdrawing it from the rear edge 24 of the chest. In this manner, if the lid is made to rest against a wall, it is brought into the raised position without difficulty.

In the modified form shown in Figs. 4 to 7, the same reference numbers have been used as in the first embodiment to indicate the same members.

In this modified form, the lid 5 is provided with two side recesses 25, inside each of which is secured a rail 26, of general U-section. Within the rail 26 slides a rail 27, also of general U-section. Ball-bearings 28, 29 are disposed between the two rails in order to facilitate their respective sliding. Each of the rails 27, of which only one is visible on the drawing, is provided at its rear end with an extension 30 carrying a pin 31, forming a pivot. This pin engages an oblong slot 32, in a member 33 forming a bearing. The said member 33 is secured in one of the side webs 34 of the chest.

Against each of the sides of the lid 5 is applied a metal sheet 35 which closes the side recesses 25. Each of the sheets 35 is however provided with an oblique slot 36, seen in dot-and-dash lines in Fig. 4 and ending, at its forward end, in a bend 37, vertically directed, in the position of the lid shown in full lines in Fig. 4. The shape of this slot 36, 37 is most clearly seen to the left of Fig. 4 and shown in dotted lines by 36', 37'.

Each of the side webs 34 of the body of the chest is provided with a pin 38, inwardly directed and each adapted to co-operate with one of the slots 36, 37, as will be described later, and also with one of the rails 27.

The lid 5 is provided, at its forward end, with a handle 39. Its lower face is provided with a sealing joint 40 of flexible material, adapted to rest against the upper face 41 of the body of the chest, surrounding the refrigerating chamber.

The operation of the modified form of Figs. 4 to 7 is as follows:

In the position shown in full lines in Fig. 4, the lid is closed and its weight rests on the body of the chest, through the intermediary of the sealing joint 40 which is pressed, under the effect of the weight of the lid, between the latter and the surface 41. If the lid is to be opened horizontally, the handle 39 is merely drawn towards oneself, that is to say to the left on Fig. 4. The lid passes to the position shown in dotted lines, where it is stopped by abutments 27a at the front end of rails 27 and abutments 26a at the rear ends of rails 26, limiting the relative movement of the rails 26 and 27. The respective abutments are simply small metal strips projecting into the space between rails 26 and 27. They may be obtained by perpendicularly bending a narrow prolongation of the rails. When the lid is completely opened horizontally (dotted lines of Fig. 4), balls 28 and 29 will no longer be able to move between abutments 26a and 27a and further movement of the lid outwardly will be effectively stopped.

Under the action of the co-operation of the pins 38 with the rails 27, the lid rises slightly and moves at the same time towards the left on Fig. 4, thus withdrawing the joint 40 from the surface 41. In the position of the lid shown in dotted lines in Fig. 4, the refrigerating chamber 1 is completely disengaged, as was the case in the previous embodiment. The movement of the lid is a translation movement, practically horizontal.

In order to reclose the lid, it is pushed back to its initial position. As soon as it reaches the position shown in Fig. 5, the joint 40 comes into contact with the surface 41 and, by means of an additional thrust exerted on the handle 39 from left to right in Fig. 5, the joint 40 is made to slide slightly on the surface 41, and at the same moment, due to the obliquity of the rails 27, the latter leave their respective pins 38 (in Fig. 5, the rail 27 still rests on the pin 38, whereas, in Fig. 4, in the full lines position, this rail has left the said pin). From this moment, the lid rests with its full weight against the joint 40 and ensures a tight sealing of the refrigerating chamber.

If, however, the lid is to be opened by a swinging movement, it is sufficient to seize the handle 39 and raise it so that the lid is pivoted through the co-operation of the pins 31 with the oblong slots 32, forming bearings. The open position of the lid is shown in dot-and-dash lines in Fig. 4.

In order to close the lid, it is sufficient to turn it down to the position shown in full lines in Fig. 4.

The oblong shape of the slots 32 permits the slight vertical movement of the lid when passing from the position in Fig. 5 to the position in Fig. 4, in the closing phase previously described.

It will be seen that, according to this modified form, from the moment when the horizontal opening movement of the lid has started, it is no longer possible to pivot the latter. Indeed, the pivoting movement is only permitted when the pins 38 are exactly opposite the bent part 37 of the slot 36, that is to say when the lid occupies the position shown in full lines in Fig. 4.

The last described embodiment of the invention offers the advantage that the upper part of the chest is devoid of any mechanical members, as well as sealing members, which makes it more agreeable for the user. The mechanical parts are, in fact, practically invisible and the sealing members offer no inconvenience, since they are secured against the lower face of the lid.

The ice-chest described has the advantage that it requires but little space, that it may be installed in any room of an apartment (the outside may be provided by cabinet-work), without its outer aspect betraying its intended purpose. Moreover, if crockery or other articles are placed on the lid, they need not be removed in order to open the lid, since the opening may take place by a horizontal movement of the lid. The raising of the lid (position shown in dot-and-dash lines) is of particular interest because it enables the interior of the chamber to be cleaned.

What we claim is:

1. In a refrigerator chest having two side walls, a front wall and a rear wall and comprising an open-top refrigerating chamber and a closure member therefor, means for laterally displacing the closure member to cover and uncover substantially the entire top, means for supporting the closure member in substantially horizontal position when it is laterally displaced to uncover the open top, said displacing and supporting means including guide means fixedly mounted on the closure member and elements fixedly attached to the side walls of the chest, said guide means and elements being arranged in cooperative relationship to allow lateral displacement of the guide means along said elements, and means in the rear wall of the chest for pivoting the closure member upwardly from its closed, horizontal position to a substantially vertical, open position around a pivotal axis which is disposed substantially in the same plane as the closure member in its horizontal position and lies near the upper edge of the rear wall.

2. In a refrigerator chest having two side walls, a front wall and a rear wall and comprising an open-top refrigerating chamber and a closure member to cover and uncover substantially the entire open top: means for laterally displacing the closure member, said means including a support element fixedly attached to each of said side walls and a guide rail fixedly attached to said closure member at each side thereof, said guide rails being arranged to engage said support elements and to slide thereover, and means in the rear wall of the chest for pivoting the closure member upwardly from its closed, horizontal position to a substantially vertical, open position around a pivotal axis which is disposed substantially in the same plane as the closure member in its horizontal position and lies near the upper edge of the rear wall.

3. In a refrigerator chest having two side walls, a front wall and a rear wall and comprising an open-top refrigerating chamber and a laterally displaceable closure member to cover and uncover substantially the entire top: a runway fixedly mounted on each of said side walls, a guide and support element mounted on each runway in the region of the front wall, a rail mounted in a recess in the bottom of the closure member on each side thereof, a first roller attached to each rail and arranged to roll along said runway during lateral displacement of the closure member, said rails being arranged to be supported by and to slide over said guide and support elements during said lateral displacement, a second and rearmost roller attached to each rail and offset in height from the first roller, and an elbow-shaped guide channel having a vertical and an oblique part in the rear wall of the chest at the end of said runways, said rearmost rollers registering with the vertical part of the guide channels when the closure member is laterally displaced to cover the open top, and said closure member being pivoted from a horizontal to a vertical position by displacing the rearmost rollers along said guide channels.

4. A refrigerator chest as defined in claim 3, wherein the rail has a rearwardly extending arm whereon said first and second rollers are mounted.

5. In a refrigerator chest having two side walls, a front wall and a rear wall and comprising an open-top refrigerating chamber and a laterally displaceable closure member to cover and uncover substantially the entire top: a first guide rail mounted on each of said side walls, a pivot attached to each guide rail, an oblong bearing arranged in each side wall for receiving the pivot, a second guide rail mounted in a recess in each side of the closure member, bearing means slidably connecting the first and the second guide rails, a guide and support element mounted in each side wall, said first guide rail being supported by said element, and a channel member closing each of said recesses and having a generally oblique part and a vertically bent part in the region of the front wall, said guide and support element protruding into said channel member.

References Cited in the file of this patent
UNITED STATES PATENTS

| Number | Name | Date |
|---|---|---|
| 169,651 | McClurg | Nov. 9, 1875 |
| 363,077 | Merritt | May 17, 1887 |
| 1,178,480 | Marx | Apr. 4, 1916 |
| 1,348,087 | Cole | July 27, 1920 |
| 1,865,212 | Rogers et al. | June 28, 1932 |
| 2,202,684 | Baker | May 28, 1940 |
| 2,414,061 | Richard | Jan. 7, 1947 |
| 2,416,132 | Watson | Feb. 18, 1947 |
| 2,457,877 | Doner | Jan. 4, 1949 |
| 2,514,936 | Cook | July 11, 1950 |
| 2,569,254 | Page | Sept. 25, 1951 |